United States Patent
Montagano

(10) Patent No.: US 9,578,815 B2
(45) Date of Patent: Feb. 28, 2017

(54) MODULAR PLANT SUPPORT POLES

(71) Applicant: Mondi Products Ltd., Vancouver (CA)

(72) Inventor: Michael Montagano, Vancouver (CA)

(*) Notice: Subject to any disclaimer, the term of this patent is extended or adjusted under 35 U.S.C. 154(b) by 71 days.

(21) Appl. No.: 14/470,184

(22) Filed: Aug. 27, 2014

(65) Prior Publication Data

US 2015/0059242 A1    Mar. 5, 2015

Related U.S. Application Data

(60) Provisional application No. 61/871,501, filed on Aug. 29, 2013.

(51) Int. Cl.
| | | |
|---|---|---|
| *A01G 17/06* | (2006.01) | |
| *A01G 17/04* | (2006.01) | |
| *E04H 15/60* | (2006.01) | |
| *E04H 15/62* | (2006.01) | |

(52) U.S. Cl.
CPC .............. *A01G 17/04* (2013.01); *E04H 15/60* (2013.01); *E04H 15/62* (2013.01); *Y10T 29/49959* (2015.01)

(58) Field of Classification Search
CPC .......... E04H 15/60; E04H 15/62; A01G 17/04
USPC ...................................... 47/44–47
See application file for complete search history.

(56) References Cited

U.S. PATENT DOCUMENTS

| | | | | |
|---|---|---|---|---|
| 3,264,783 | A * | 8/1966 | Bayliss ..................... | A01G 9/12 108/190 |
| 3,447,263 | A * | 6/1969 | Johnson ................. | A01G 17/14 285/302 |
| 4,020,592 | A * | 5/1977 | Saunders ............... | A01G 9/042 47/47 |
| 4,218,415 | A * | 8/1980 | Biscaro .................. | A01G 9/122 249/91 |
| 5,301,481 | A * | 4/1994 | Novak .................... | A01G 9/122 47/47 |
| 6,382,223 | B1 * | 5/2002 | Lah ......................... | E04H 15/34 135/114 |
| 9,060,470 | B1 * | 6/2015 | Donaldson ............. | A01G 17/06 |
| 2008/0190019 | A1 * | 8/2008 | Hart ........................ | A01G 9/12 47/47 |
| 2008/0209802 | A1 * | 9/2008 | Williams ................ | A01G 29/00 47/47 |
| 2012/0186149 | A1 * | 7/2012 | Dray ...................... | A01G 17/06 47/45 |
| 2015/0176302 | A1 * | 6/2015 | Duqum .................. | E04H 15/60 135/114 |

* cited by examiner

*Primary Examiner* — Kristen C Hayes
(74) *Attorney, Agent, or Firm* — Benoit & Cote, Inc.

(57) ABSTRACT

In embodiments there is disclosed a modular pole for horticultural and agricultural use, pole sections and connector pins for use to assemble the pole, and methods for assembling the pole. In embodiments a connector pin is inserted into end sockets in opposed pole section ends and in embodiments the ends are held onto the connector pin by a fastener which may comprise a clip or a threaded sleeve.

17 Claims, 3 Drawing Sheets

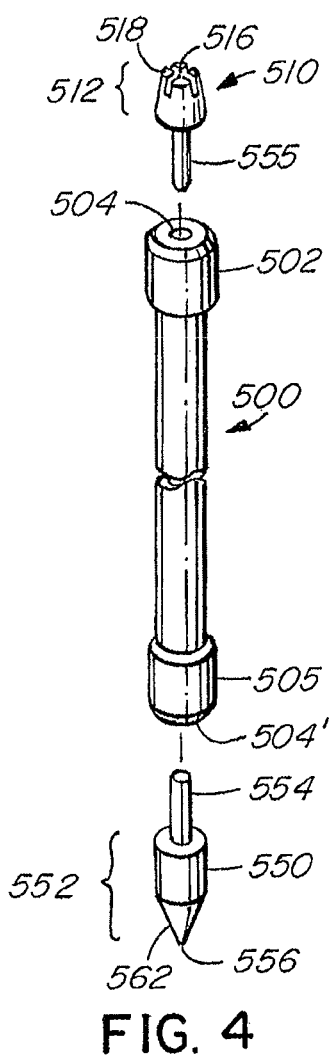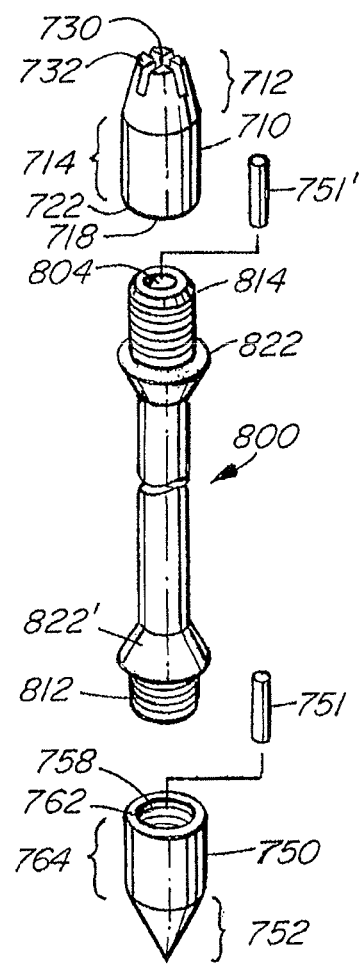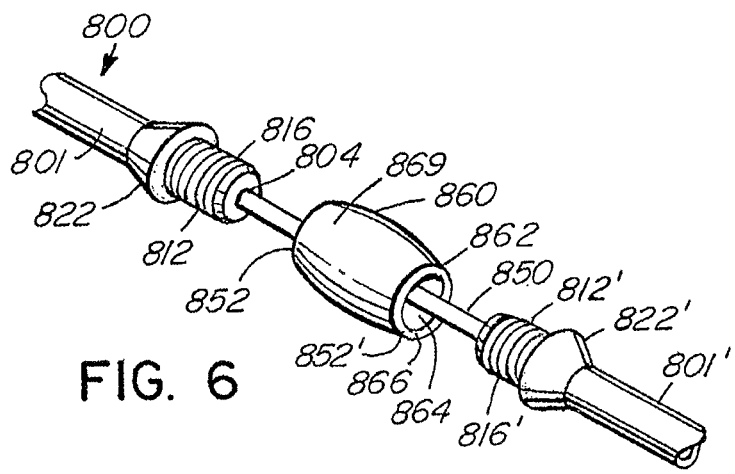

MODULAR PLANT SUPPORT POLES

BACKGROUND

1. Field

The subject matter disclosed generally relates modular poles for horticultural and agricultural use.

2. Related Prior Art

Modular poles are known in the art but the existing designs suffer from a range of disadvantages. U.S. Pat. No. 7,458,475 to Ho describes a modular tree like assembly for displaying potted plants. U.S. Pat. No. 8,006,434 to Allsop and Clausen describes a telescopic gardening stake. US2008034650 to Williams describes a modular pole structure wherein successive segments are screwed into one another. The contents of U.S. Pat. No. 7,458,475, U.S. Pat. No. 8,006,434 and U.S. Patent Application Publication No. 2008/034650 are all incorporated herein in their entirety.

SUMMARY

The subject matter disclosed herein provides a design for modular plant support poles which allows a maximum cumulative pole length to be stored in a given volume while still providing pole construction that is strong and convenient. A combination of a detachable connector pin to secure pole elements against lateral movement and fasteners to prevent longitudinal movement results in strong and durable joints between pole segments.

In a first series of embodiments there is disclosed a plant support pole comprising at least first and second pole sections, and at least one connector pin: each pole section having first and second free ends, each said free end comprising a connector pin receiving socket; said at least one connector pin having two connector pin ends, each of said connector pin ends sized to mate with a said connector pin receiving socket so that opposed mating of two said free ends with said connector pin ends substantially prevents relative lateral movement of said free ends.

In embodiments the pole further comprises a fastener for holding said opposed free ends in mutual engagement with said connector pin.

In embodiments the free ends are threaded.

In embodiments the fastener comprises two threaded sockets for receiving and securing said threaded free ends in mutual opposition.

In embodiments the fastener comprises a clip.

In embodiments at least one free end comprises a flange for engaging said clip.

In embodiments connector pin is a metal rod.

In embodiments the pole further comprises at least one end piece.

In alternative embodiments, there is disclosed pole section for a modular plant support pole, said section comprising a free end, said end comprising an axial socket sized to mate with a cooperating connector pin.

In embodiments the pole section comprises two said free ends, and wherein both said ends comprise a said axial socket.

In embodiments each of the ends is adapted to engage a fastener.

In embodiments at least one of the ends is threaded.

In embodiments at least one of the ends comprises a flange.

In a further series of embodiments there is disclosed a method for assembling a plant support pole comprising first and second pole sections, the method comprising the steps of: mating a first end of a double ended connector pin into a first connector pin receiving socket in a first end of said first pole section and mating a second end of said double ended connector pin with a second connector pin receiving socket in a second end of said second pole section to thereby restrain relative lateral movement of said opposedly connected first and second ends.

In embodiments the method further comprises holding the opposed first and second free ends in said engagement with the connector pin.

In embodiments the connector pin is a metal cylinder.

In embodiments holding comprises clipping.

In embodiments the holding comprises screwing the opposed free ends into threaded sockets in a fastener.

In yet a further series of embodiments there is disclosed a kit for a modular plant support pole, the kit comprising: a plurality of pole sections, each said pole section having two free ends, at least one of said free ends of each said pole section having a connector pin receiving socket; and a plurality of double ended connector pins for simultaneous insertion into two opposed said end sockets.

In embodiments the kit further comprises a plurality of fasteners and wherein the fasteners comprise clips or threaded sockets.

In embodiments the kit further comprises a plurality of end pieces.

Features and advantages of the subject matter hereof will become more apparent in light of the following detailed description of selected embodiments, as illustrated in the accompanying figures. As will be realized, the subject matter disclosed and claimed is capable of modifications in various respects. Accordingly, the drawings and the description are to be regarded as illustrative in nature, and not as restrictive or limiting.

BRIEF DESCRIPTION OF THE DRAWINGS

FIG. 4 shows the assembly of a pole comprising end pieces according to the first embodiment.

FIG. 5 shows the assembly of a pole comprising end pieces according to second embodiment.

FIG. 6 shows the assembly of two pole pieces according to the second embodiment.

DETAILED DESCRIPTION OF THE PREFERRED EMBODIMENTS

Definitions of Terms

Figure 1:
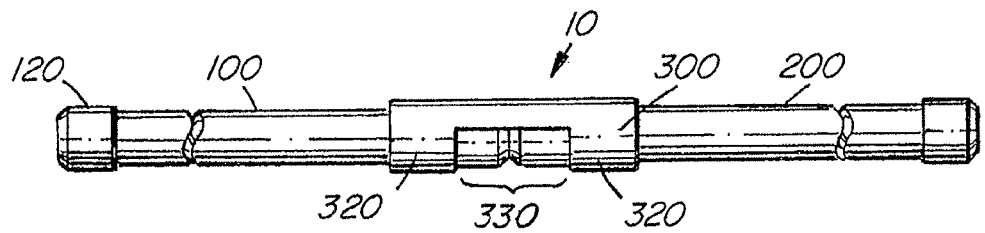
FIG. 1 is a perspective view of two assembled pole sections according to a first embodiment.

In this disclosure, the word "comprising" is used in a non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

In this disclosure the recitation of numerical ranges by endpoints includes all numbers subsumed within that range including all whole numbers, all integers and all fractional intermediates (e.g., 1 to 5 includes 1, 1.5, 2, 2.75, 3, 3.80, 4, and 5 etc.).

In this disclosure the singular forms a "an", and "the" include plural referents unless the content clearly dictates otherwise. Thus, for example, reference to a composition containing "a compound" includes a mixture of two or more compounds.

In this disclosure term "or" is generally employed in its sense including "and/or" unless the content clearly dictates otherwise.

In this disclosure, unless otherwise indicated, all numbers expressing quantities or ingredients, measurement of properties and so forth used in the specification and claims are to be understood as being modified in all instances by the term "about". Accordingly, unless indicated to the contrary or necessary in light of the context, the numerical parameters set forth in the disclosure are approximations that can vary depending upon the desired properties sought to be obtained by those skilled in the art utilizing the teachings of the present disclosure and in light of the inaccuracies of measurement and quantification. Without limiting the application of the doctrine of equivalents to the scope of the claims, each numerical parameter should at least be construed in light of the number of reported significant digits and by applying ordinary rounding techniques. Not withstanding that the numerical ranges and parameters setting forth the broad scope of the disclosure are approximations, their numerical values set forth in the specific examples are understood broadly only to the extent that this is consistent with the validity of the disclosure and the distinction of the subject matter disclosed and claimed from the prior art.

In this disclosure the term "connector pin" or "connecting rod" means an elongated structure having at least two ends, such ends being sized for insertion into suitably sized sockets in the ends of cooperating pole sections. In embodiments connector pins are solid and in embodiments are hollow. In the illustrated embodiment the connector pin ends are substantially smooth and the cooperating pole ends comprise sockets sized to receive the insertion of a connector pin end. In embodiments a connector pin is a metal rod of suitable length and diameter, and in embodiments is a steel rod and in embodiments is a metal or steel tube. A steel connector pin may alternatively be referred to herein as an "extension steel piece". In embodiments the poles, connector pin ends and cooperating sockets are substantially circular in cross section but it will be understood that in alternative embodiments any desired cross sectional shape may be adopted for the poles and for the sockets and the connector pin ends. It will be appreciated that engagement of a connector pin with two pole sections to be joined results in substantially coaxial end to end engagement of the connector pin and the two pole sections thereby joined. It will be understood that in embodiments of a connector pin, first and second ends of the connector pin may have different cross sectional shape and size to cooperate with suitably shaped and sized receiving sockets or sockets. In embodiments a connector pin is a steel rod or tube of suitable rigidity and about 97 mm long and about 10 mm in diameter. It will be understood that these dimensions and the shape and material of a connector pin may be adjusted in a variety of ways to suit larger or smaller poles and pole sections as desired. Thus in alternative embodiments a connector pin is between about 50 and 60 mm long, between about 60 and 70 mm long, between about 70 and 80 mm long, between about 80 and 90 mm long, between about 90 and 100 mm long, between about 100 and 110 mm long, between about 110 mm and 120 mm long, between about 120 and 130 mm long, between about 130 mm and 140 mm long or longer. In embodiments a connector pin is between about 2 and 4 mm in diameter between about 4 and 6 mm in diameter, between about 6 and 8 mm in diameter, between about 8 and 10 mm in diameter, between about 10 and 12 mm in diameter, between about 12 and 14 mm in diameter, between about 14 mm and 16 mm in diameter or is greater than 16 mm in diameter. Herein the term "cylinder" is used to denote both solid and hollow cylinders unless the context requires otherwise. The dimensions and design of plugs for the insertion of end pieces into pole section ends may be similarly adjusted. All such adjustments will be readily understood and implemented by those skilled in the art.

In this disclosure the term "pole section" or "pole segment" means a defined length or module of a pole, a plurality of which sections are joinable end to end in embodiments, using suitably sized and shaped connector pins. A side view of a single pole section according to an embodiment is shown in FIG. 7A. In embodiments, pole sections are about 10, 11, 12, 13, 14, 15, 16, 17, 18, 19, 20, 21, 22, 23, 24, 25, 26, 27, 28, 29, or 30 inches in length, or are more than about 30 inches in length. In particular embodiments, pole sections are about 18 inches long. In embodiments a pole piece is of substantially uniform cross section or diameter and in alternative embodiments different ends of the pole section have different cross sections or diameters. Similarly, in embodiments the connector pin receiving sockets or sockets at both ends of a pole section have the same cross sectional shape and size as each other. In alternative embodiments such sockets or sockets may be different. It will be understood that the sockets provided in ends of pole sections are sized and shaped to accept a cooperating connector pin but are also sized and shaped to prevent the connector pin extending too far into the pole section. Thus it will be seen that where the connector pin is simply a rod or tube, the socket will end or be constricted at about half a connector pin length into the section so that the connector pin is only insertable for about half its length into a first section end socket and the remaining half of the connector pin is available for insertion into an end socket of an adjoining pole section end. In embodiments the shaft or main part of pole section is solid and in embodiments it is hollow, and in alternative embodiments is solid over at least a substantial part of its length or in alternative embodiments is hollow over a substantial part of its length. In embodiments the shaft of a pole section has a substantially uniform diameter. In embodiments a pole section is substantially symmetrical and any number of pole sections may be interchanged and assembled end-to-end in ways described herein. In embodiments a pole section is substantially straight and in alternative embodiments a pole section is curved, bent, twisted, or otherwise shaped as desired by a user. In particular embodiments a bent or curved pole section may be used to join other pole sections to form an upper joint or the top of a frame.

In this disclosure the term "end piece" means a component of desired shape and size and intended for insertion into a free end of a pole section at an end of a completed pole. In embodiment end pieces comprise a plug or projection sized and shaped to cooperate with the socket in the end of a pole section in the same way as a connector pin end cooperates with a socket. In embodiments an end piece is tapered, pointed or otherwise adapted to secure the free end of the relevant pole section in a substrate. In embodiments an end piece is shaped to accept or for securing thereto, other rods, poles, rings, cords, strings, ropes, ribbons or other structures. It will be understood that the illustrated end pieces are only examples of possible designs and for example an end piece may comprise a helical thread, barbs, hooks, clips, pins, brackets, holes, Velcro™ or other structures as may be desired to allow such end piece to be secured to other structures or to serve alternative functions, a range of which will be readily understood by those skilled in the art. In this disclosure reference is made to "top" and "bottom" end pieces, it will be understood by those skilled in the art that these descriptors refer to the manner in which particular designs of end piece will commonly, but not always, be used. Thus a top or flattened end piece, or end piece comprising a recessed, grooved area or comprising other adaptations, will commonly be disposed at an upper end of a pole in use, embodiments of one possible such end piece design comprising a broadly cross shaped recess are shown in FIGS. 4 and 5. Likewise, a pointed or tapered end piece that does not comprise accessory structures, grooves, recesses or the like will be generally suitable for inserting into a substrate or anchoring or engaging against a substrate, and examples of embodiments of such end pieces shown in FIGS. 4 and 5.

Figure 7:
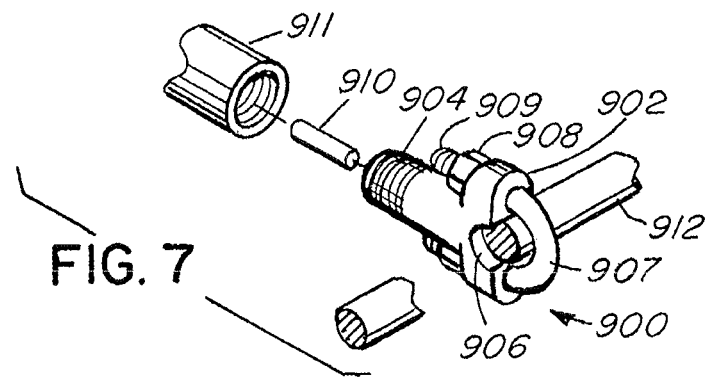
FIG. 7 shows an alternative embodiment of an end piece.
Figure 8:
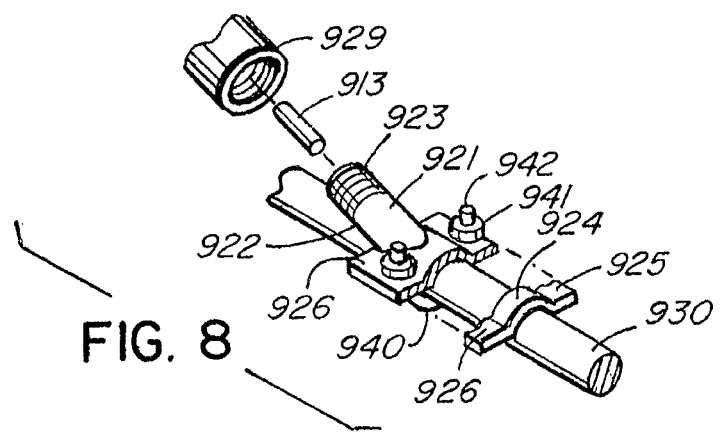
FIG. 8 shows a further alternative embodiment of an end piece.

Further alternative embodiments of end pieces are shown in FIGS. 7 and 8.

It will be understood that a top end piece is not necessarily positioned at the top end of a pole in all circumstances and that a bottom end piece is not necessarily positioned at the bottom end of a pole in all circumstances and that the designators merely indicate the particular suitability of such end pieces for such applications.

In this disclosure the term "fastener" means any device suitable to secure two opposed pole ends against longitudinal separation. In embodiments a fastener is a clip. In embodiments a fastener comprises threaded sockets for accepting threaded pole piece ends. In embodiments a fastener comprises a threaded sleeve. In embodiments a fastener is shaped for convenient manipulation by a user. In embodiments a fastener is suitable to immobilise a joint formed by the cooperating insertion of the two ends of a connector pin into opposed free pole section ends.

In this disclosure "mating engagement" "mate" and like terms mean the close fitting insertion of a projection into a suitably sized receiving socket.

In this disclosure the term "sleeve" refers generally to a hollow shape and in embodiments a fastener may be in the form of a sleeve comprising end sockets or channels.

In this disclosure the term "clip" means a clip or other device suitable to secure two adjacent pole ends against longitudinal separation. In embodiments the clip is a spring clip which fits snugly around the outside of the junction of two pole ends with a connector pin to thereby prevent either of the pole ends becoming disengaged from the connector pin. In embodiments the clip is a metal clip and in embodiments is a plastic clip. In embodiments the clip is formed from a resilient metal or plastic which presses inwardly on the adjacent pole sections to thereby maintain their engagement with the cooperating connector pin. In embodiments a clip is shaped to secure pole sections of the same cross sectional dimensions. Those skilled in the art will readily understand and make any necessary or desirable adjustments to size and design or components all consistent with the object hereof.

All components used herein may be made from any suitable materials. In particular embodiments, pole sections, connector pins, clips and end pieces are made from or comprise or consist of suitable metals, plastics, ceramics, wood, resins or other materials. In embodiments components are made from metal. In embodiments components comprise carbon fiber. In embodiments components are made from aluminium. In one embodiment pole sections are formed from solid plastic or are hollow plastic tubes, connector pins are steel rods or tubes, and clips are flexible plastic. A variety of possible selections, combinations and uses of materials will be readily identified and understood by those skilled in the art who will readily choose amongst them for particular purposes. Similarly the dimensions of pole sections will be readily chosen to suit particular applications and plant types.

In this disclosure the term "pole" means any kind of elongated rod, pole, stick, stake, post, brace, or other equivalent structure and where used in reference to specific embodiments means generally an assembly of any number of pole sections and where more than one pole section is used then such sections are substantially coaxially joined. In embodiments a pole comprises one or more end pieces. In embodiments a pole comprises at least 1, 2, 3, 4, 5, 6, 7, 8, 9, 10, 11, 12, 13, 14, 15, 16, 17, 18, 19, 20 or more pole sections. In embodiments, a plurality of the sections have the same length. In embodiments a plurality of the pole sections are substantially the same as each other. In embodiments poles are suitable to support growing plants of any chosen types and use is contemplated for all manner of plants where a support pole may be desired. Similarly use of a pole for any suitable gardening, horticultural and agricultural uses is contemplated. In particular embodiments, plants are horticultural, agricultural or ornamental types. In embodiments plants are fruiting plants or may be vegetables. Non limiting examples of plants include: tomato, pea, bean, sweet pea, rose, blackberry, raspberry, zucchini, fruit trees, dahlias, chrysanthemums. Those skilled in the art will recognise a vast range of plant types with which the disclosed subject matter may be used and all such plant types are contemplated hereby.

In this disclosure the term "thickened" or "enlarged" and similar terms when used with reference to the end or ends of a pole section, indicate that the external diameter of such end of the section is larger than the diameter of the shaft portions of the section. In particular embodiments this may mean that the outer walls of the end of the pole are themselves thickened but this is not necessarily the case. In embodiments the enlargement or thickening of the section end is sufficient to prevent a cooperating clip from slipping off the end of the pole. It will be understood that where enlarged or thickened pole ends are used to engage a clip so as to secure two opposed section ends, then the clips used will be chosen so that when they are in the closed position they are small enough to be prevented from slipping off the section by the enlarged section ends, but may be flexed or opened far enough when desired, so that the clip can be disengaged from the pole section when desired.

Embodiments are now described with general reference to FIGS. 1 through 9.

First Embodiment

In a first embodiment described with reference to FIGS. 1 through 4, there is disclosed a modular pole (also referred to as a stake) for supporting the growth of a plant, and methods for assembling and using the pole. The embodiment comprises a plant support pole generally designated 10 and at least a first pole section 100 and a second pole section 200, and at least one connector pin 50. In embodiments pole sections 100 and 200 are identical. In embodiments a plurality of pole sections are provided.

First pole section 100 has a shaft 102 and first and second free ends 112, 114, each comprising a socket 104 for receiving an end 55 of connector pin 50. The shaft 102 comprises walls 128 and a central cavity 126 ending with barriers or partitions 125 which also define the ends of sockets 104 for receiving connector pin ends 55. It will be seen at the ends of the pole section the walls are thickened over a region 120, tapering at surfaces 125 to a distal end surface 124 at the free end of the pole section and forming a flange 122 where the thickened region adjoins shaft 102.

The structure of a second pole section is essentially identical to the first pole section and is only further enumerated here to assist in explanation of the assembly of a pole according to the embodiment. Second pole section 200 has the same structure as the first pole section, having a shaft 202 first and second free ends 212, 214 each free end comprising a socket 204 for receiving a connector pin end 55. The shaft 202 comprises walls and a central cavity ending with barriers or partitions which also define the ends of sockets 204 in the same manner as in first pole section 100. These are not further illustrated here but will be understood from the explanation of the first pole section 100 and from FIG. 3. It will be seen at the ends of the pole section the walls are thickened over a region 220, tapering to a distal end surface 224 and forming a flange 222 proximate to the shaft.

Sockets 104, 204 are generally coaxial with the pole sections. It will be understood that the shaft is generally hollow to reduce the amount of material required for manufacturing of the pole sections and to reduce weight. However those skilled in the art will readily understand that in embodiments the shaft may optionally be solid or may be partly filled or braced in a variety of ways, all of which will be readily understood and implemented by those skilled in the art.

Connector pin 50 is a substantially symmetrical rigid pin having ends 55 sized to mate with sockets 104, 204 so that opposed mating of two free pole piece ends with said connector pin ends substantially prevents relative lateral movement of said free ends. It will be understood that a socket depth will be approximately half the length of the connector pin. In embodiments connector pins or socket walls comprise ridges, or are tapered, or comprise other structural features to facilitate a snug fit between the components. It will be understood that in embodiments a connector pin may have additional structural features such as a central flange. In embodiments the connector pin is a solid rod and in alternative embodiments is a hollow metal tube and in embodiments is steel. In alternative embodiments the connector pin comprises a central flange and has two opposed ends separated by the flange. In embodiments the connector pin is metal.

As will be seen, when a pole 10 is assembled, adjacent pole sections 100, 200 are joined substantially coaxially end to end using connector pin 50 whose two ends 55 are inserted into sockets 104, 204 of opposed pole section ends.

Figure 2:
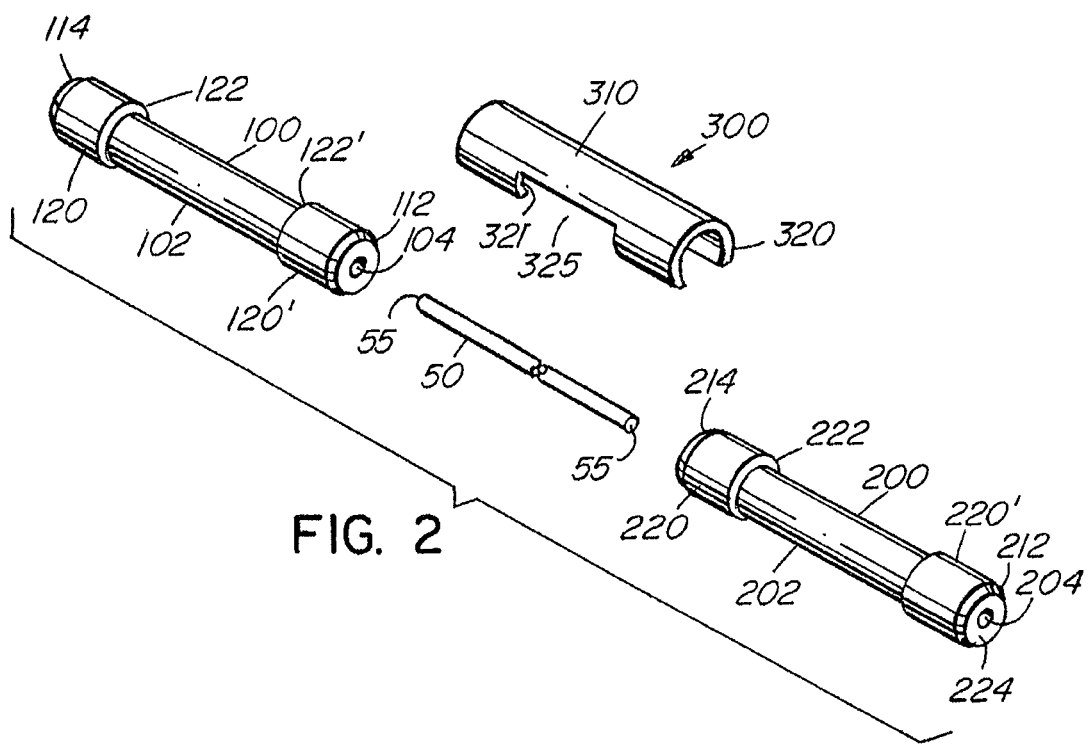
FIG. 2 is an exploded view of the embodiment according to FIG. 1.

As will be seen with particular reference to FIGS. 1 and 2 there is also provided a fastener 300 comprising a spine 310 and four curved wings 320 which partially define a channel 325. The opposed pairs of wings at the ends of the spine 310 are separated by a distance 330. The wings are sufficiently flexible to be forced open around the shaft of a pole section. Distance 330 is set to be equivalent to the lengths of two thickened pole ends 120 so that when a fastener 300 is forced into engagement with the shafts 102, 202 of two pole sections 100, 200 with two opposed and closely appressed first 112 and second 214 pole ends, then the wings 320 of fastener 300 secure the shafts of the opposed pole section ends and the inner edges 321 of wings 320 are able to engage flanges 122, 222 of the opposed pole section ends. In embodiments this is a snug engagement but it will be appreciated that some degree of play in such an assembled joint can be tolerated depending on user requirements. It will be understood that the combination of the inserted connector pin 50 and an external fastener 300 results in a rigid joint. The connector pin 50 serves to hold the opposed pole ends in substantially coaxial alignment and the fastener 300 prevents longitudinal separation of the ends. Thus in the illustrated embodiment the fastener 300 is a clip, and may be made of any suitable material. In embodiments the wings are plastic and in embodiments the wings are suitably flexible metal. In embodiments the clip is unitary and is premoulded metal or is premoulded plastic.

In the illustrated embodiment sockets 104, 204 at the end of a pole section are generally cylindrical and the connector pin 50 is a suitably sized cooperating cylindrical rod which in embodiments is a metal rod. In embodiments the socket is an axial socket. It will be understood that in embodiments a pole section end may optionally comprise a plurality of sockets, and in such instances may be joined by a plurality of connector pins. It will understood that a connector pin and its socket may have any suitable compatible cross sections, shapes and dimensions.

In the illustrated embodiment there are also provided end pieces or caps which comprise plugs sized and shaped to fit snugly into a pole section end socket. This is described with general reference to FIG. 4 wherein a pole is generally designated 500, and may comprise any desired number of pole piece sections. The pole 500 comprises a first or top end 502 and a second or bottom end 505. The top end is defined by a top end piece 510 and the bottom end by a bottom end piece 550. The end pieces are now described in greater detail with reference to FIG. 5. It will be seen that top end piece 510 comprises a crown 512 comprising a cross shaped recess or grooves 516 defined by teeth 518, the crown being joined to a plug 555 which is sized to fit snugly into the end socket 504 at end 502 of the pole section. In embodiments the channels are useable for the insertion of labels, or to facilitate mounting of nets, cords or strings. Similarly, bottom end piece 550 comprises an body 552 with a pointed distal end 556, and a plug 554 sized to fit snugly into end socket 504' of pole end 505. The pointed end of bottom end piece 550 is intended to facilitate engagement with a substratum.

It will be understood that the end pieces illustrated are merely examples of a range of possible designs and are not in any sense limiting.

Thus the assembly of a complete pole according to the embodiment is a convenient and simple process. The desired number of pole sections is selected, two sections are joined end to end by the insertion of a connector pin 50 across the two opposed ends, and a clip 300 is applied to secure the two opposed section ends. The process is repeated until the desired number of pole sections has been joined end to end. Any desired end pieces are inserted into the free section ends, and the pole is ready for use.

Figure 3:
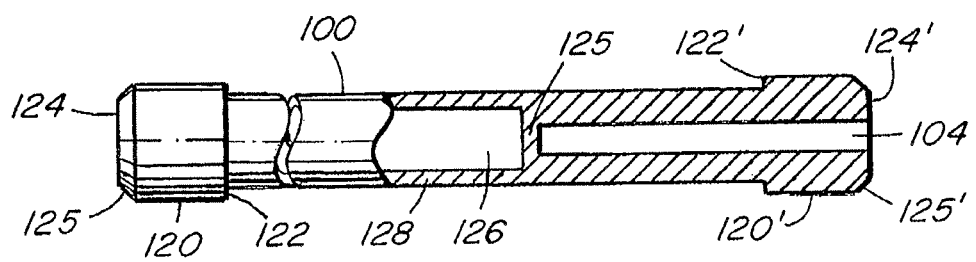
FIG. 3 is a side and partly sectional view of a pole section according to the first embodiment.

The method of pole assembly is now more fully described with reference to FIGS. 1, 2 and FIG. 3. First and second pole sections 100, 200, are mated with the opposed ends 55 of connector pin 50 whose opposed ends 55 are respectively inserted in into a first connector pin receiving socket 104 in a first end 112 of the first pole section 100 and mating a second end 55 of the double ended connector pin 50 with a second connector pin receiving socket 204 in a second end 214 of the second pole section 200 to thereby restrain relative lateral movement of the opposedly connected first and second ends 112, 214. In embodiments the method further comprises holding the opposed first and second free ends in engagement with the connector pin, this may be achieved by positioning a suitably sized spring clip 300 as described above, across the junction of the two opposed pole ends. In embodiments the connector pin 50 is a metal rod. In embodiments the holding comprises clipping and in a further series of embodiments described below, holding comprises screwing the opposed free ends into threaded sockets in a fastener.

It will be understood that disassembling a pole is simply the reverse of the assembly process. It will be appreciated that with the removal of the connector pins from any pole sections, the pole components can be conveniently packed for storage and shipping and can be stored in a container sized to accept the pole section length. It will be understood that the ability to remove the connector pin entirely allows for the pole sections to be shorter than if the connector pin were permanently fixed at the end of a pole section. In selected embodiments the pole sections are 12, or 18 inches in length but any other alternative lengths may be chosen. In particular embodiments a pole section is about 4, 5, 6, 7, 8, 9, 10, 11, 12, 13, 14, 15, 16, 17, 18, 19, 20, 21, 23, 24, 25, 26, 27, 28, 29, 30 or more inches in length.

The seal formed between an end piece and the pole section end may also serve to exclude dirt and unwanted materials from the joint. Again, as many pole sections as desired may be secured end to end and pole end pieces may be added or omitted as desired.

Second Embodiment

In a further series of embodiments described with general reference to FIGS. 5 and 6, screw threads are used to secure joined parts. In the embodiments the free end of a pole section is threaded on its outer surface and forms the male part of a joint. A cooperating cap or end piece or fastener comprises the female portion of the joint.

In embodiments all pole ends will be of the same construction and accordingly, for simplicity of explanation, a single set of numbering is used to describe the features of a pole section end for the purpose of illustrating the screw thread joints of this embodiment.

In the embodiment, the end to end joining of adjacent shafts is achieved by a fastener comprising a threaded sleeve. As will be seen in FIG. 6, first and second pole sections 801, 801' each comprise a free end 812 with a threaded outer surface 816. The pole section ends 812 each also comprise a central socket 804 sized to accept an end of a cooperating connector pin or plug 50. Thus the two ends or connector pin 50 are inserted into opposed pole section ends 812, 812'.

A double ended fastener 860 comprises a wall 862 and bore 864 having threaded interior walls and an outer surface 869 which is may optionally be textured or shaped for improved grip or to suit particular requirements. The walls of the fastener end at ends 852, 852' of fastener 860 in rims 866, 866'. The threaded inner surfaces of fastener 860 define at each end of the fastener a female threaded cavity for threadingly accepting a cooperating pole section end.

In the illustrated embodiment of this embodiment poles sections 801, 80' comprise a shaft having a wall, hollow central cavity and end barrier in the same manner as the pole sections of the first embodiment. The section ends 812 are thickened and threaded 816 with a flange 822 at the end of a thread distal to the pole section end. Again it will be understood that the hollow shaft construction is optional and a range of shaft structures are equally possible.

To assemble two pole sections, fastener 860 is screwed down over the threaded outside 816 of a first rod end 812, this may be tightened until end 866 of the fastener is secure against flange 822 as desired by a user. Connector pin 50 is inserted into socket 804 in one of the pole section ends to be opposed. The second section end 812' is then screwed into the other end of the fastener 860 to form a stable joint with the connector extending into both of the opposed axial holes 804, 804' and the opposed pole section ends secured thereon by fastener 860.

The application of end pieces according to one embodiment of this threaded embodiment is similar to the assembly of joints, in that the end pieces comprise threaded sockets for engagement with the free threaded section ends. A pole generally designated 800 may comprise any desired number of pole sections. Again an end piece may be generally designed as a first or top end piece 710 or as a second or bottom end piece 750. As will be seen in FIG. 5 a first top end piece again comprises a crown 712, with grooves 730 and teeth 732, and a securing portion 714 comprising a threaded socket 718 sized to accept a pole section end 814. The socket is readily screwed onto a threaded pole section end 814 of a pole section 800 until end surface 722 of the end piece contacts flange 822.

The attachment of a second or bottom end piece is essentially the same as the application of a first or top end piece. Bottom end piece 750 comprises outer end 752 and securing part 764 comprising threaded socket 758 and has an end surface 762.

When screwed onto a threaded section end 812, end surface 762 of the end piece 750 may be appressed to flange 822 to tighten the joint or form a seal or both. As with other embodiments, a central connector pin 751 is inserted into opposed receiving channels to brace and strengthen the joints between the end pieces and the associated pole section end.

The seal formed by the flange and the cap may also serve to exclude dirt and unwanted materials from the joint. By this means a suitable end piece is firmly secured to the end of the rod. Again, as many pole sections as desired may be secured end to end and pole end pieces may be added or omitted as desired.

Third Embodiment

In a third series of embodiments there is disclosed a kit for a modular plant support poles according to the other embodiments.

In embodiments the kit comprises: a plurality of pole sections comprising end sockets; a plurality of connector pins sized to span two opposed end sockets; and a plurality of fasteners sized to mutually secure two pole section ends that are joined by a connector pin. In embodiments the kit comprises end pieces.

Variants and Alternative Embodiments

It will be understood that embodiments may be combined in whole or in part. Thus an embodiment comprising a threaded fastener may also comprise end pieces that are attached by means of insertable projections, and alternative embodiments of the first embodiment, may comprise end pieces that are threadingly engaged with ends of a pole.

It will be understood that poles, pole sections, connector pins and sockets may have any desired cross section provided that such choices of cross section are suitably coordinated so that connector pins and sockets are mutually compatible, and that the pole section ends are compatible with any chosen clips or fasteners or end pieces, as necessary. By way of illustration and not limitation, in embodiments cross-sections of particular features may be generally circular, square, triangular, hexagonal, octagonal or may have other shapes. Those skilled in the art will readily choose and implement all such designs.

Figure 9:
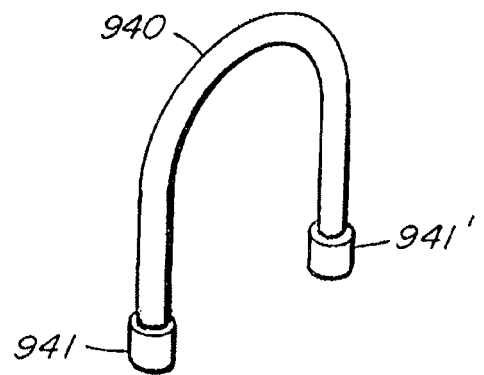
FIG. 9 shows a further embodiment of a pole section.

It will be understood that in embodiments pole pieces are generally longitudinally symmetrical. FIG. 9 shows an embodiment of a pole section that is curved and is useable to join other pole sections to form the top of a frame. A variety of other shapes and their uses will be readily understood by those skilled in the art.

In embodiments the two ends of the connector pin are separated by a flange and the two ends or the connector pin are substantially the same length and diameter. In embodiments a connector pin is hollow over at least a part of its length. In embodiments a socket and its cooperating connector pin are be of non-uniform diameter. In embodiments a socket and its cooperating connector pin are of substantially uniform cross section. In embodiments a connector pin end and a cooperating socket cross section are adapted to prevent the connector pin end from extending into the section end beyond a predetermined distance. It will be understood that in alternative embodiments the different ends of the connector pin will have different external diameters to facilitate the joining of pole segments of different sizes. In alternative embodiments the connector pin ends and receiving sockets comprise mutually engaging screw threads or other means of mutual engagement.

In embodiments a pole section comprises a shaft of substantially uniform cross-section. In embodiments a pole section comprises additional structures such as hooks, loops, ridges or texturing to suit particular applications.

It will be understood that in alternative embodiments poles may be suitable for supporting plants of a range of types. In particular embodiments, plants are tomatoes, peas, beans, sweet peas, roses or any other variety of plant.

It will be understood that in particular embodiments alternative materials may be chosen to satisfy the needs of a user. Those skilled in the art will readily select and use all such materials.

It will be understood that in alternative embodiments the clip and connector pin may be combined and connector pin may engage the pole section ends externally rather than internally so that instead of the connector pin forming the male component of a male-female joint as illustrated, the pole section end may form the male component of the joint.

Alternative Embodiments of End Pieces

Alternative embodiments of end pieces are described with reference to FIGS. 7 and 8.

The alternative embodiments are intended to allow convenient interconnection of poles so that poles can be conveniently formed into frames of desired configuration. Such constructions may also comprise the use of curved pole pieces such as the example illustrated in FIG. 9, comprising a curved shaft 940 and ends 941 which can be connected with other pole pieces as already described.

FIG. 9 shows an end piece for forming a generally right angled joint between a first pole end 911 and a second pole 912. The end piece generally designated 900 comprises a threaded portion 904 which engages pole end 911 as described elsewhere herein. Connector pin 910 is inserted as described elsewhere to strengthen the joint. End piece 900 also comprises a connecting end 902 which is wide and thickened, and comprises an end recess 906 sized to accept pole 912. A U bolt or similar structure 907 is inserted through holes in the end piece, and by tightening nuts 908 on the ends 909 of the U bolt, the pole 912 is secured into place relative to the end piece 900 and thus pole end 911.

The embodiment illustrated in FIG. 8 shows an alternative embodiment of an end piece generally designated 920 which secures a first pole 929 at a defined angle to a second pole 930, the attachment being achieved by threading engagement strengthened by connecting pin 913. The angle is determined by the shape of the end piece, and in particular by the angle between the stem 921 comprising threaded portion 923, and the attachment portion 924 which receives pole 930. In the illustrated embodiment of this embodiment attachment portion 924 comprises a channel 925 and flanges 926. With pole 930 aligned in channel 925, one or more U bolts 940 are inserted into suitably positioned holes in flanges 926 and reach over pole 930. Nuts 941 are tightened onto bolt ends 942 to secure the pole 930 in place. It will be understood that the design of this embodiment may be varied in a variety of ways, all without departing from the scope hereof. In particular embodiments it will be understood that the attachment portion 924 and channel 925 and thus any pole 930 is at an angle of about 45 degrees, about 90 degrees, about 22 degrees, or the angle may be variable, relative to the connected pole end. In particular embodiments an end piece may be preformed to give a joint angle of about 10, 15, 20, 25, 30, 35, 40, 45, 50, 55, 60, 65, 70, 75, 80, 85 or 90 degrees between two pole joined thereby. Those skilled in the art will understand that by the insertion of a hinge between threaded portion 923 and channel portion 924, the angle between the two joined poles may be freely selected by a user. Those skilled in the art will also recognise in embodiments channel 925 may be omitted and that pole 930 may be secured to attachment portion 924 in a variety of ways.

It will be seen that threaded portion 923 joints to pole 929 in the same way as other embodiments, the joint again being braced by a connecting pin 928

The embodiments and examples presented herein are illustrative of the general nature of the subject matter claimed and are not limiting. It will be understood by those skilled in the art how these embodiments can be readily modified and/or adapted for various applications and in various ways without departing from the spirit and scope of the subject matter disclosed claimed. The claims hereof are to be understood to include without limitation all alternative embodiments and equivalents of the subject matter hereof. Phrases, words and terms employed herein are illustrative and are not limiting. Where permissible by law, all references cited herein are incorporated by reference in their entirety. It will be appreciated that any aspects of the different embodiments disclosed herein may be combined in a range of possible alternative embodiments, and alternative combinations of features, all of which varied combinations of features are to be understood to form a part of the subject matter claimed. Particular embodiments may alternatively comprise or consist of or exclude any one or more of the elements disclosed.

The embodiments of the invention in which an exclusive right or privilege is claimed are defined as follows:

1. A plant support pole comprising at least first and second pole sections, and at least one connector pin:

each pole section having first and second free ends, each said free end comprising a connector pin receiving socket;

said at least one connector pin having two connector pin ends, each of said connector pin ends sized to mate with a said connector pin receiving socket;

so that opposed mating of two said free ends with said connector pin ends substantially prevents relative lateral movement of said free ends;

the plant support pole further comprising a fastener for holding said opposed free ends in mutual engagement with said connector pin.

2. The plant support pole according to claim 1 wherein said free ends are threaded.

3. The plant support pole according to claim 2 wherein said fastener comprises two threaded sockets for receiving and securing said threaded free ends in mutual opposition.

4. The plant support pole according to claim 1 wherein said fastener comprises a clip.

5. The plant support pole according to claim 4 wherein at least one free end comprises a flange for engaging said clip.

6. The plant support pole according to claim 1 wherein the pole further comprises at least one end piece.

7. A plant support pole comprising at least first and second pole sections, and at least one connector pin:

each pole section having first and second free ends, each said free end comprising a connector pin receiving socket;

said at least one connector pin having two connector pin ends, each of said connector pin ends sized to mate with a said connector pin receiving socket;

so that opposed mating of two said free ends with said connector pin ends substantially prevents relative lateral movement of said free ends;

wherein said connector pin is a metal rod.

8. A method for assembling a plant support pole comprising first and second pole sections, the method comprising the steps of:

mating a first end of a double ended connector pin into a first connector pin receiving socket in a first end of said first pole section and mating a second end of said double ended connector pin with a second connector pin receiving socket in a second end of said second pole section; to thereby restrain relative lateral movement of said opposedly connected first and second ends; and holding said opposed first and second free ends in said engagement with said connector pin wherein the connector pin is a metal cylinder.

9. The method according to claim 8 wherein said holding comprises clipping.

10. The method according to claim 8 wherein said holding comprises screwing said opposed free ends into threaded sockets in a fastener.

11. A kit for a modular plant support pole, said kit comprising:

a plurality of pole sections, each said pole section having two free ends, at least one of said free ends of each said pole section having a connector pin receiving socket; and a plurality of double ended connector pins for simultaneous insertion into two opposed said end sockets.

12. The kit according to claim 11 further comprising a plurality of fasteners and wherein the fasteners comprise clips or threaded sockets.

13. The kit according to claim 12 comprising a plurality of end pieces.

14. A plant support pole comprising at least first and second pole sections, and at least one connector pin:

each pole section having first and second free ends, each said free end comprising a connector pin receiving socket;

said at least one connector pin having two connector pin ends, each of said connector pin ends sized to mate with a said connector pin receiving socket;

so that opposed mating of two said free ends with said connector pin ends substantially prevents relative lateral movement of said free ends;

wherein at least one of said connector pin ends is threaded.

15. The plant support pole according to claim 14 wherein said connector pin ends mate with said connector pin receiving sockets to define a male-female joint.

16. The plant support pole according to claim 14 wherein each of said ends is adapted to engage a fastener.

17. The plant support pole according to claim 16 wherein at least one of said ends comprises a flange.

* * * * *